Nov. 3, 1925.  A. SPILLMAN  1,559,800
ENGINE PISTON
Filed July 12, 1921

Inventor;
Albert Spillman,
by Geiger & Popp
Attorneys.

Patented Nov. 3, 1925.

1,559,800

UNITED STATES PATENT OFFICE.

ALBERT SPILLMAN, OF NORTH TONAWANDA, NEW YORK.

ENGINE PISTON.

Application filed July 12, 1921. Serial No. 484,124.

*To all whom it may concern:*

Be it known that I, ALBERT SPILLMAN, a citizen of the United States, residing at North Tonawanda, in the county of Niagara and State of New York, have invented new and useful Improvements in Engine Pistons, of which the following is a specification, This invention relates to the pistons used in explosion engines or motors.

Its object is to provide an improved self-adjusting and non-rattling piston which is capable of expanding and contracting with the cylinder, so as always to fit snugly therein to obtain the maximum efficiency of the motor and at the same time avoid scoring of the cylinder.

Figure 1:
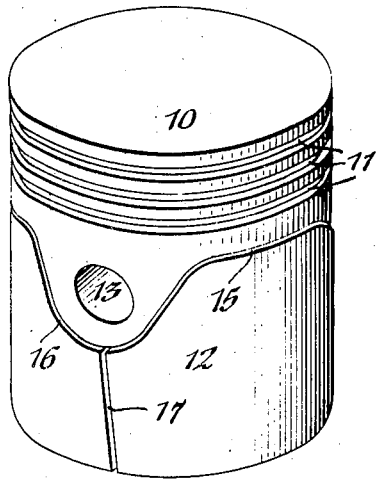
Figure 2:
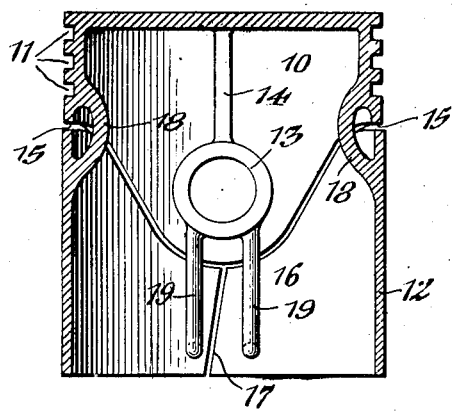
Figure 3:
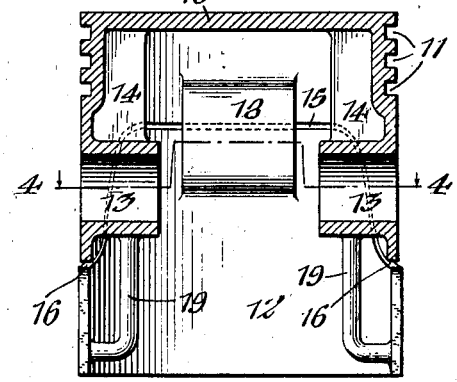
Figure 4:
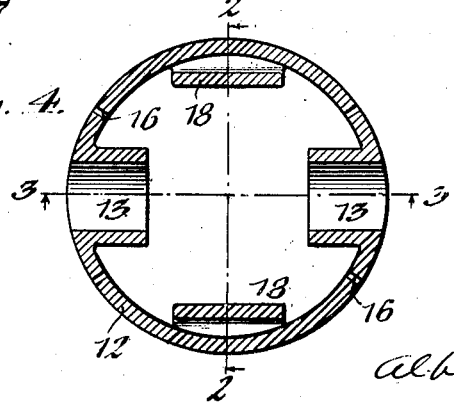

In the accompanying drawings: Figure 1 is a perspective view of a piston embodying my invention. Figures 2 and 3 are vertical sections on the correspondingly-numbered lines in Fig. 4. Figure 4 is a transverse section on line 4—4, Fig. 3.

Similar characters of reference indicate corresponding parts throughout the several views.

10 represents the head of the piston which is provided with the cutomary ring receiving grooves 11, and 12 the skirt or tubular body portion thereof. Integral with the latter and extending inwardly from diametrically opposite sides thereof are suitable bearings 13, 13 for the wrist-pins of the connecting rod, not shown. Reinforcing ribs 14 are preferably provided for these bearings, said ribs extending lengthwise of the piston from the bearings to the head 10, as shown in Figs. 2 and 3. These bearings are arranged substantially midway of the length of the piston.

In order to give the skirt of the piston the necessary resilience to expand and contract with the cylinder, the same is separated from the head of the piston by a continuous or uninterrupted transverse slit preferably having two substantially horizontal portions 15, 15 arranged diametrically opposite each other, and two curved or approximately U-shaped portions 16, 16 forming continuations of said horizontal portions. The latter are formed principally in those sides of the skirt at right angles to the sides containing the bearings 13, 13, while the U-shaped portions extend around the bottom and sides of said bearings at a suitable distance therefrom, as shown in Figs. 1 and 2. Longitudinal slits 17 may also be provided in the skirt, which preferably extend from the base of the U-shaped portions of the transverse slit to the lower edge of the skirt and are arranged obliquely to prevent scoring of the cylinder. As will be observed from Figs. 1 and 2, the slits 17 are preferably arranged diametrically opposite each other and substantially in line with the axes of the wrist-pin bearings 13. While two of the last-named slits are shown in the drawings, only one may be employed, if desired.

The transverse slits 15, 16 and the oblique slits 17 divide the skirt longitudinally into a pair of semi-circular sections separated from the head 10 of the piston. Each of these sections is connected to the head of the piston by one or more webs or bridge pieces 18 extending lengthwise of the piston and preferably cast integral therewith. As shown in Fig. 2, these webs are located at a point substantially opposite the horizontal slit portions 15, being spaced therefrom and the adjacent inner sides of the piston head and skirt. The upper end of each connecting web is joined to the lower portion of the piston head at a point a suitable distance above the corresponding slit portion, while its lower end is joined to the upper portion of the corresponding skirt section a suitable distance below said slit portion. These connecting webs are elastic or resilient enough to allow the skirt sections of the piston to yield more or less in response to the expanding and contracting movements of the cylinder. Although two of these webs are shown in the drawings, more may be employed, if desired, depending on the size of the piston.

While serving to resiliently connect the skirt sections with the head of the piston, the webs 18 also serve as conductors to transmit the heat from the head to the skirt from which it is radiated.

In order to render the resilient skirt portions of the piston somewhat stiff and still permit them to expand and contract with the cylinder, stiffening posts or rods 19, 19 are preferably provided which connect the lower ends of said skirt portions with the bearings or hollow bosses 13 and are cast integral therewith. As shown in Figs. 2 and 3, these posts are preferably arranged in pairs on diametrically opposite sides of the piston, the posts of each pair being located on either side of the adjacent diagonal slit 17. In the construction shown, these posts are substantially L-shaped, and separated from the walls of the head and skirt portions of the piston, their upper ends being joined to the lower ends of the respective wrist-pin bearings 13 or adjacent portion of the piston-head, while their lower ends are joined to the lower ends of the skirt sections.

By this construction, the sectional skirt while free to expand and contract, is prevented from collapsing below its normal diameter and remaining in such position.

The skirt or body portion 12 of the piston is of the proper diameter to fit the cylinder without clearance when cold, while the head 10 is sufficiently smaller in diameter than said skirt to clear the cylinder wall under the maximum expansion of the head section. The parts of the piston surrounding the bearings 13 are somewhat relieved, as usual. This close fit of the skirt is permitted without danger of scoring the cylinder owing to the resilience of the skirt practically around its entire circumference.

While insuring maximum engine efficiency, this improved piston is non-rattling; it reduces friction to a minimum, and its simple, integral construction enables it to be manufactured at low cost.

I claim as my invention:

1. A piston comprising a head, a skirt including resilient sections separated from said head by a slit extending continuously around the piston, and webs connecting said sections with said head, said webs being spaced from the inner side of the head and the skirt sections and having their upper and lower ends joined thereto adjacent to said slit.

2. A piston comprising a head having wrist-pin bearings at opposite sides, a skirt separated therefrom by a slit extending continuously around the piston, the portions of said slit formed in the sides of the skirt at right angles to the sides containing the wrist-pin bearings being substantially transverse, while the remaining portions are substantially U-shaped and extend around the lower sides of said bearings, slits extending substantially from the bases of said U-shaped portions to the lower edge of said skirt, whereby the skirt is divided into yieldable sections, and means for conecting said skirt-sections with said head.

3. A piston comprising a head, a skirt separated therefrom by a continuous transverse slit, a longitudinal slit extending from the latter to the lower edge of said skirt, and posts arranged lengthwise of the piston on either side of said longitudinal slit and connected at their upper ends to said head and at their lower ends to said skirt.

4. A piston comprising a head having wrist-pin bearings at opposite sides, a skirt separated therefrom by a slit extending continuously around the piston, the portions of said slit formed in the sides of the skirt at right angles to the sides containing the bearings being substantially transverse, while the remaining portions are U-shaped and extend around the lower sides of said bearings, slits for dividing said skirt longitudinally and extending from said U-shaped portions at a point substantially in alinement with the axes of said wrist-pin bearings, to the lower edge of said skirt, means for joining the skirt sections to the piston head, and upright posts arranged on either side of said longitudinal slits and connected at their upper ends to said bearings and at their lower ends to the opposing portions of said skirt sections.

5. A piston comprising a head having wrist-pin bearings at opposite sides, a skirt separated therefrom by a slit extending continuously around the piston, the portions of said slit formed in the sides of the skirt at right angles to the sides containing the bearings being substantially transverse, while the remaining portions are U-shaped and extend around the lower sides of said bearings, slits dividing said skirt longitudinally and extending from said U-shaped portions at a point substantially in alinement with the axis of said wrist-pin bearings, to the lower edge of said skirt, and substantially L-shaped posts arranged on either side of said longitudinal slits and joined at their upper ends to said wrist-pin bearings and at their lower ends to the adjacent portions of said skirt sections.

ALBERT SPILLMAN.